Patented May 20, 1924.

1,494,879

UNITED STATES PATENT OFFICE.

FREDERICK WILLIAM ATACK, OF CHARLESTON, WEST VIRGINIA.

PROCESS OF MANUFACTURING CARBAZOL DERIVATIVES.

No Drawing.    Application filed June 22, 1922.  Serial No. 570,192.

*To all whom it may concern:*

Be it known that I, FREDERICK WILLIAM ATACK, a subject of the King of Great Britain, residing at Charleston, county of Kanawha, State of West Virginia, have invented certain new and useful Improvements in a Process of Manufacturing Carbazol Derivatives; and I do hereby declare the following to be a full, clear, and exact description of the invention, such as will enable others skilled in the art to which it appertains to make and use the same.

This invention relates to processes of manufacturing carbazol derivatives; and it relates particularly to a process of preparing alkyl, aryl or alkaryl derivatives of carbazol, more especially the important alkyl derivatives, in a simple, efficient, and economical manner.

I have found that many carbazol derivatives of the type above set forth can be easily prepared by suspending a metal compound of carbazol, such as potassium compound of carbazol (which will be referred to herein as "metal carbazol" and "potassium carbazol" for the sake of convenience), in pulverized or otherwise finely divided condition in a liquid medium, most desirably a solvent of the derivative to be produced, that is substantially inert or inactive so far as concerns the procedure here in question; and then subjecting the metal carbazol in suspension to the action of any suitable agent for introducing an alkyl, aryl or alkaryl group in place of the metal of the metal carbazol, to produce the corresponding carbazol derivative. Where the solvent or other liquid medium employed as a suspension vehicle is one from which it is desirable to separate the carbazol derivative eventually obtained, this can be accomplished in any suitable manner as, for example, by distillation in case the liquid medium employed is volatile, although I do not restrict myself to the use of a volatile liquid medium.

In order to more fully explain the principles upon which the invention is based, the manufacture of ethyl carbazol will now be described as an illustrative example embodying the invention in especially desirable and important practical form. Potassium carbazol, which may be obtained in the known manner by fusing a mixture of carbazol and caustic potash (with sufficient water) in proper proportions, is introduced in pulverized condition into a relatively large volume of benzene contained in a reaction vessel equipped with suitable stirring or agitating means and a reflux condenser, and the mixture is agitated to obtain a uniform suspension of the pulverized potassium carbazol in the liquid vehicle. In a typical instance, potassium carbazol obtained from one (1) kilo of carbazol is thus suspended in three (3) liters of benzene. A sufficient quantity of a suitable ethylating agent, such as diethyl sulfate, say about 800 cc. in the present example, is now added gradually during constant agitation of the mixture in the reaction vessel. The mixture is boiled under reflux until the ethylation is substantially complete. The potassium carbazol is converted into ethyl carbazol, which latter dissolves partly or wholly in the benzene. When the reaction is substantially or sufficiently complete, the benzene solution of ethyl carbazol together with any undissolved ethyl carbazol is decanted or otherwise separated from the potassium sulfate and the solvent is removed by steam distillation or otherwise. The ethyl carbazol thus obtained may be purified in any suitable manner, as by recrystallization from alcohol, the purified product having a melting point of 67°–68° C.

It will be seen that the described method is free from complications and can be carried out easily and quickly. The yield is good and a product of excellent purity can be made.

While the process has been described more particularly in connection with the manufacture of ethyl carbazol, it can nevertheless be extended generally to the manufacture of alkyl, aryl or alkaryl carbazols that are capable of being made by the action of a halogen-containing organic compound on potassium carbazol. Typical specific examples of such other carbazol derivatives that can be manufactured by the novel process hereinabove described are methyl carbazol and benzyl carbazol.

What I claim is:

5. The process of manufacturing ethyl carbazol which comprises agitating a mixture comprising finely divided potassium carbazol, diethyl sulfate and benzene until the reaction is substantially complete, driving off said benzene, and optionally purifying the resultant ethyl carbazol.

In testimony whereof I hereunto affix my signature.

FREDERICK WILLIAM ATACK.